United States Patent
Reiss et al.

(10) Patent No.: US 11,190,331 B1
(45) Date of Patent: Nov. 30, 2021

(54) DATA ALIGNMENT IN PHYSICAL LAYER DEVICE

(71) Applicant: Cadence Design Systems, Inc., San Jose, CA (US)

(72) Inventors: Loren B. Reiss, Raleigh, NC (US); Scott David Huss, Cary, NC (US); Fred Staples Stivers, Raleigh, NC (US); James Dennis Vandersand, Jr., Chapel Hill, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/124,280

(22) Filed: Dec. 16, 2020

(51) Int. Cl.
*H04L 7/00* (2006.01)

(52) U.S. Cl.
CPC .................................. *H04L 7/0008* (2013.01)

(58) Field of Classification Search
CPC .................................................... H04L 7/0008
See application file for complete search history.

(56) References Cited

U.S. PATENT DOCUMENTS

| | | | |
|---|---|---|---|
| 10,739,811 B2* | 8/2020 | Sim | G06F 1/12 |
| 11,133,793 B1* | 9/2021 | Huss | H03K 5/131 |
| 2002/0082500 A1* | 6/2002 | Henderson | G10K 11/346 |
| | | | 600/443 |
| 2008/0049825 A1* | 2/2008 | Chen | H04L 25/03057 |
| | | | 375/233 |
| 2015/0095565 A1* | 4/2015 | Morris | G11C 11/4096 |
| | | | 711/109 |

* cited by examiner

*Primary Examiner* — Jaison Joseph
(74) *Attorney, Agent, or Firm* — Schwegman Lundberg & Woessner, P.A.

(57) ABSTRACT

A physical layer (PHY) device comprises a phase interpolator to generate a set of sampler clocks. A sampler of the PHY device samples a calibration data pattern based on the set of sampler clocks. A data alignment system of the PHY device performs a coarse calibration and a fine calibration on the sampler clock signals. During the coarse calibration, the data alignment system moves the sampler clock signals earlier or later in time relative to the sampled data based on a first bit of the sampled data. During the fine calibration, the data alignment system moves the sampler clock signals earlier or later in time relative to the sampled data based on the first bit, a second bit, and a third bit in the sampled data.

20 Claims, 6 Drawing Sheets

DATA ALIGNMENT IN PHYSICAL LAYER DEVICE

TECHNICAL FIELD

The present disclosure generally relates to integrated circuits (ICs). In particular, the present disclosure addresses data alignment in a physical layer (PHY) device.

BACKGROUND

A PHY is an electronic circuit that connects a link layer device to a physical medium such as an optical fiber or copper cable. A transmitter (TX) PHY transmits data to a receiver (RX) PHY to facilitate data transfer. On the TX PHY, data is encoded, segmented, and transmitted over multiple communication lanes, and on the RX PHY, incoming data is decoded and aggregated back together. Multiple samplers can be included in the data path of the RX PHY to sample the incoming data received from the TX PHY. Each sampler samples data based on a rising or falling edge of one of multiple sampler clock signals. Each sampler requires that its clock be aligned to an optimal position where the clock edge is aligned with received serial data.

Traditionally, the first bit of parallel data that was transmitted by the TX PHY on the serial line can show up in any parallel bit position on the parallel data received at the RX PHY. PHY designs commonly include functionality to detect where the first bit is on the receiver parallel data path and move it (and the other bits of parallel data relative to it) to the first bit position. For example, traditional approaches to address the alignment of sampler clocks include using first in, first out (FIFO) structure in the data path of the RX PHY to perform deskewing operations with respect to the sampler clocks. However, these traditional approaches introduce significant latency in the data transmission.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

To address data alignment issues in PHY data communication, aspects of the present disclosure include systems, methods, and devices for a clock data recovery loop filter (CDRLF)-based data alignment within an RX PHY. As will be discussed in further detail below, a data alignment system that includes a CDRLF aligns a set of clocks driven by a phase interpolator (PI) to an optimal phase location relative to received high-speed data. The data alignment system performs an initial lock calibration of these clocks relative to the received data. Additionally, the data alignment system locates a first logical bit of transmitted parallel data (bit 0) and aligns it to a first bit of the received parallel data path.

For the lock calibration, a unique data pattern is selected to be transmitted by a far end TX PHY. This data pattern is created such that both the edge data between two consecutive unit intervals (UIs) and the first bit of the transmitted parallel data word are capable of being detected. When this data pattern is received, the lock calibration function first adjusts the PI clocks until the first bit of the transmitted parallel data word is detected as being present in the first bit of the received parallel data path. Subsequently, the lock calibration function refines the alignment by further adjusting the phase of the PI clocks such that the clock used to sample a data crossing point is aligned with the edge data in the received pattern. Once this clock is aligned, the clocks are optimally aligned to the recovered data and the first bit of the transmitted parallel data is in the first bit of the received parallel data. Once this calibration is complete, the PX PHY returns to a functional operation, where it maintains the alignment over time.

Figure 1:
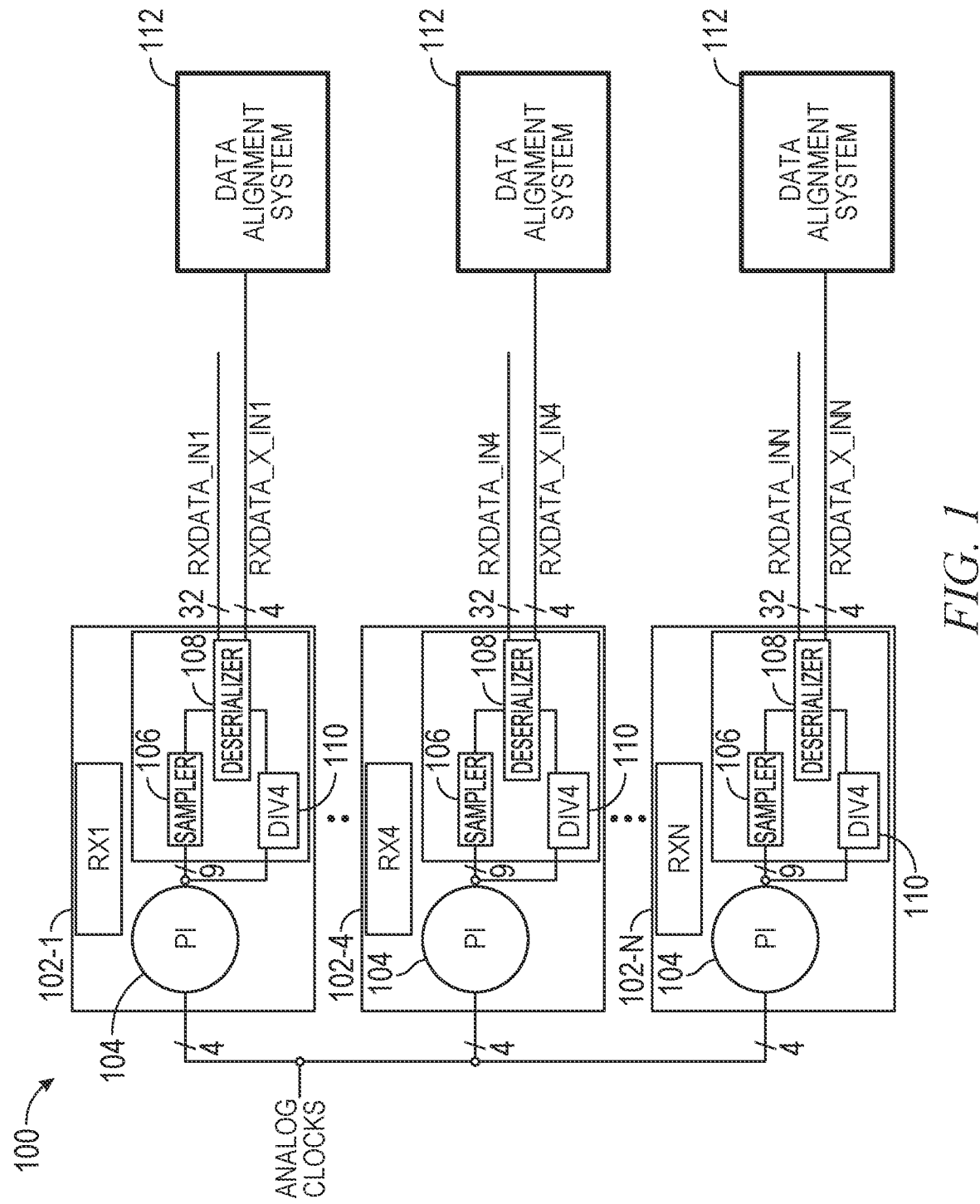
FIG. 1 is a block diagram illustrating a PHY device configured for low latency data alignment, according to some example embodiments.

With reference to FIG. 1, a PHY device 100 for serial data communication is illustrated, according to some example embodiments. The PHY device 100 includes multiple analog communication lanes 102-1 to 102-N. Each analog communication lane 102-1 to 102-N includes a phase interpolator (PI) 104, a sampler 106, a deserializer 108, and a divider 110.

Each PI 104 generates a set of clock signals based on one or more input clock signals provided by an on-chip clock source that are provided at the input of the PI 104. For example, as shown in FIG. 1, each PI 104 is provided with four common quadrature clocks. During normal modes of operation, the set of clock signals generated by each PI 104 are used by the corresponding sampler 106 in the analog communication lane to sample data received from a transmitter (TX) PHY device. Accordingly, the set of clocks are referred to as "sampler clocks." N data sampler clocks are generated by the PI 104 along with one or more edge sampler clocks (e.g., a zero-crossing sampler clock). Ideally, the sampler clocks have the following phase relationships: 1) the rising edges of data sampler clock signals are equal in time between their respective rising edges; and 2) the edge sampler clock's rising edge is equal in time between a first and second data sampler clock signal.

As shown, within each lane, the output of the PI 104 is connected to the input of the sampler 106 and the sampler clocks output by the PI 104 are provided to the sampler 106. As noted above, in normal operation modes, the samplers 106 use the sampler clocks to sample serial data received from a transmitter. As an example, the components of the device 100 can form part of a receiving (RX) PHY that is in communication with a TX PHY to enable high-speed communication. In this example, the samplers 106 sample incoming data received from the TX PHY using the sampler clocks. Each deserializer 108 deserializes the sampled serialized data and provides the deserialized data as an output. In operation, the sampler 106 and the deserializer 108 in each lane work in conjunction to translate high-speed serial data to a lower-speed parallel data word.

To ensure proper alignment of data transmitted between the TX PHY and the RX PHY, the PHY device 100 is placed into a calibration mode to perform a clock data recovery loop filter (CDRLF) lock calibration. The device 100 can be placed into calibration mode at start-up or during any period in which incoming data is not being received.

While in calibration mode, each sampler 106 uses sampler clocks to sample a calibration data pattern (e.g., 0x0001FFFE) received from TX PHY. The sampler 106 within each lane is connected to a data alignment system 112. Within each lane, sampled data from the calibration data pattern is output by the sampler 106 to the data alignment system 112 and the data alignment system 112 aligns the sampled calibration data pattern to a first bit position in the data path of the corresponding communication lane. The data alignment system 112 aligns the sampled calibration pattern by causing the PI 104 to adjust the phase of a sampler clock. The data alignment system 112 adjusts the phase of a sampler clock by moving the sampler clock earlier or later in time relative to the sampled data depending on whether the sampled data lags or leads the sampler clock.

To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the device 100 to facilitate additional data transfer functionality that is not specifically described herein.

Figure 2:
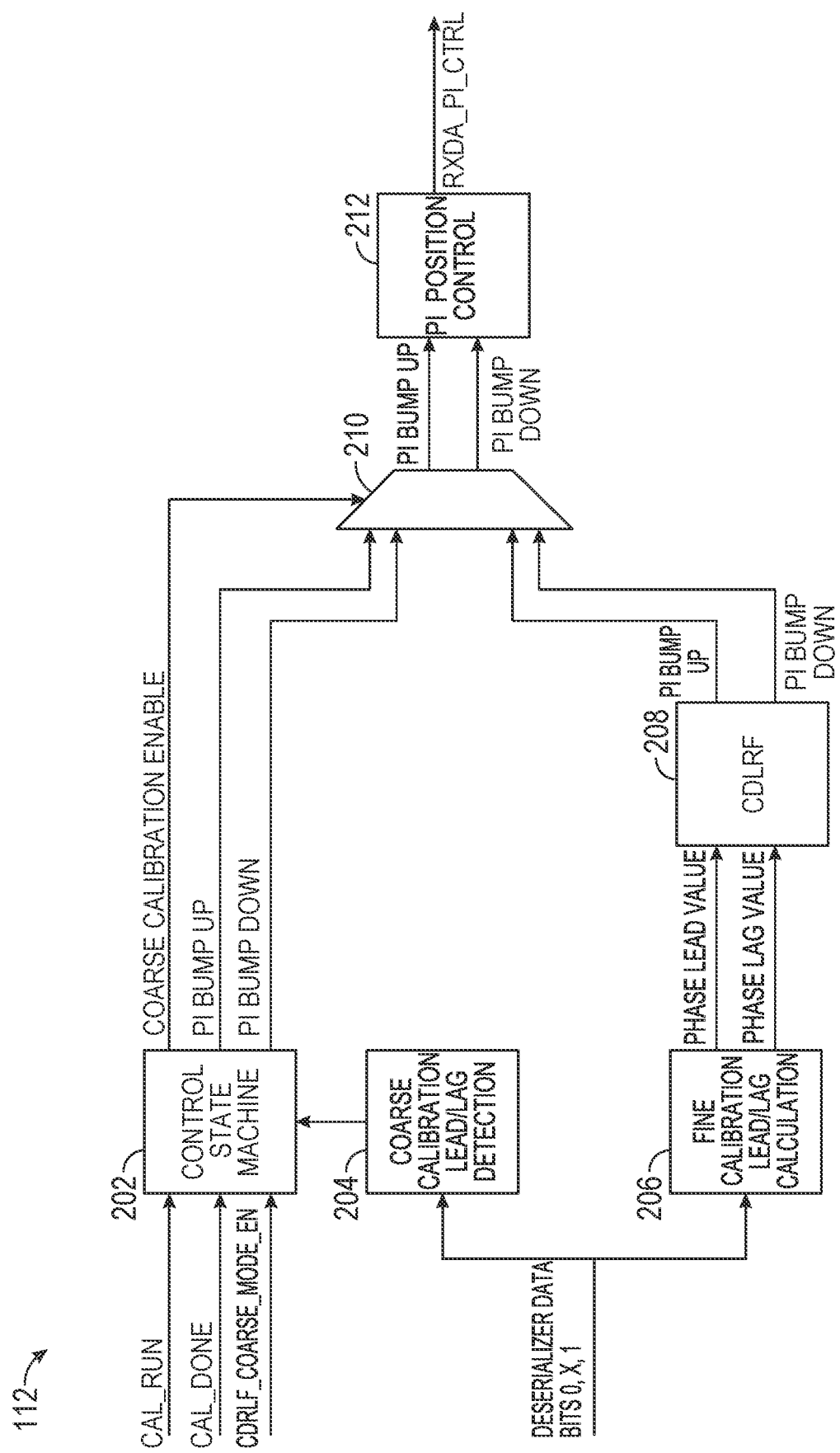
FIG. 2 is a block diagram illustrating a data alignment system of the PHY device, according to some example embodiments.

FIG. 2 is a block diagram illustrating a data alignment system 112 of the PHY device 100, according to some example embodiments. As shown, the data alignment system 112 comprises a state machine 202, a coarse calibration lead/lag detection component 204, a fine calibration lead/lag calculation component 206, a CDRLF 208, a multiplexer 210, and a PI position control component 212.

While in calibration mode, a data alignment system 112 within a communication lane of the PHY device 100 aligns deserialized data output by a corresponding deserializer 108 in the lane to a calibration data pattern, which is a predetermined data pattern known by the PHY device 100. The data alignment system 112 aligns the deserialized data to the known data pattern of the PHY device 100 by shifting phases of all sampler clocks generated by the corresponding PI 104 in the analog communication lane of the PHY device 100. To this end, a TX PHY transmits a predefined serial calibration data pattern (e.g., 32'h001FFFE) to each lane of the PHY device 100. The calibration data pattern is defined such that a rising edge exists between a first and second bit (bit 0 and bit 1) to align data in the data path of the PHY device 100. A sampler 106 in each of the analog communication lanes 102-1 to 102-N produces sampled data by sampling the calibration data pattern at intervals based on the sampler clocks generated by a corresponding PI 104 in each analog communication lane. For example, the sampler 106 in each lane samples the calibration data using the sampler clocks provided by the divider 110 in the corresponding lane. A deserializer 108 in each of the analog communication lanes 102-1 to 102-N deserializes the sampled data and provides the parallel sampled data as output. The deserializer 108 uses a divided down version of the sampler clocks to deserialize the sampled data. Parallel data sampled using the sampler clocks is provided as input to the data alignment system 112. The sampled data includes data sampled based on the edge sampler clock, which is referred to hereinafter as "X data." For example, as illustrated, the first, second, and third bits of the X data (illustrated as clkX[0], clkX[1], and clkX[2]) are received as input by the data alignment system 112.

Figure 3:
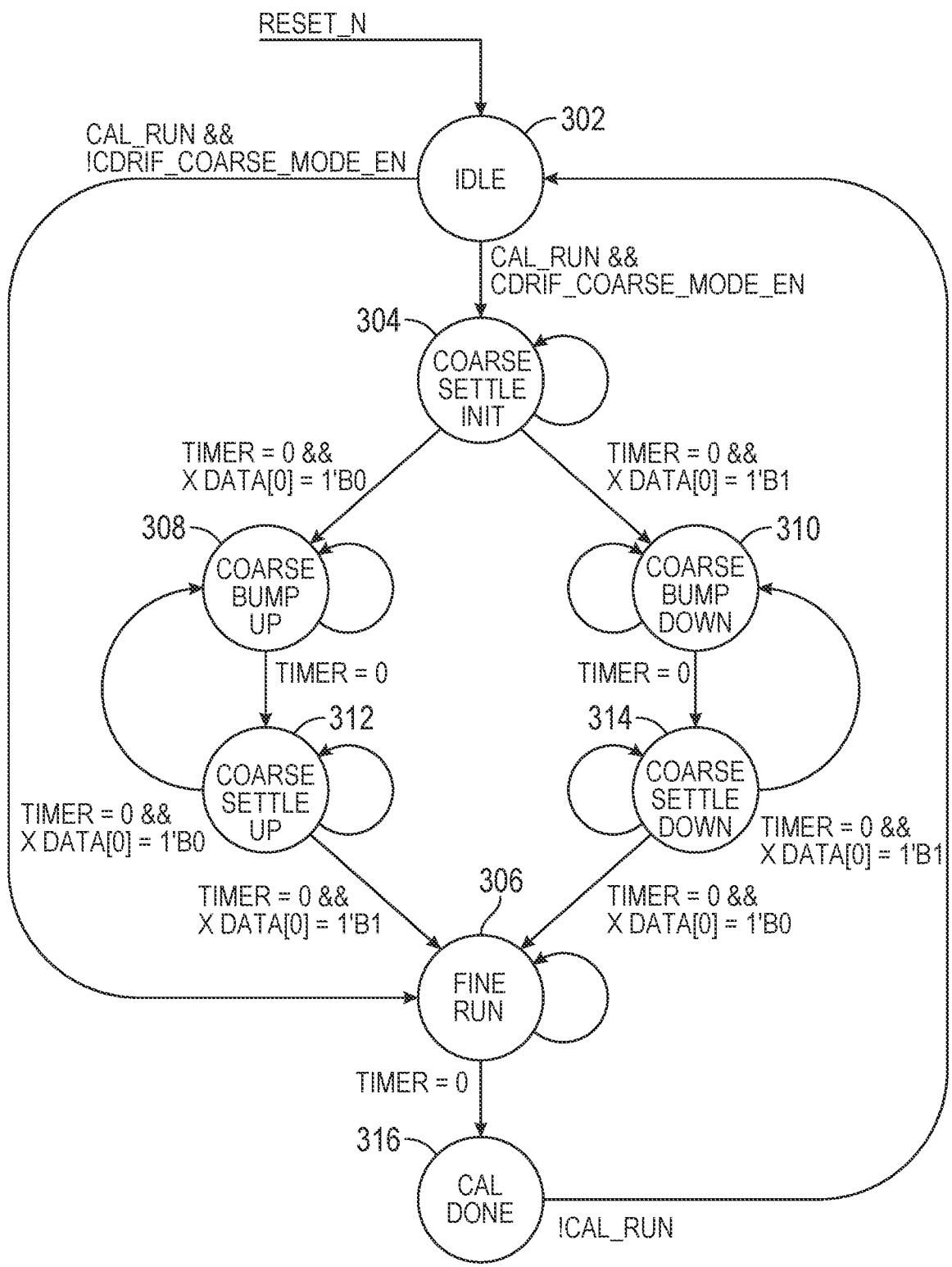
FIG. 3 is a state diagram illustrating a state machine to control data alignment within the data alignment system of the PHY device, according to some example embodiments.

The state machine 202 controls the behavior of the data alignment system 112 in performing a data alignment calibration within the PHY device 100. For example, FIG. 3 illustrates details of the state machine 202, according to some example embodiments. As shown, at power on, the state machine 202 is initiated in in an idle state 302. The state machine 202 remains in state 302 until a request to run a calibration (illustrated in FIGS. 2 and 3 as "cal_run") is received. When the request is received, the state machine 202 advances to a Coarse Settle Initiation state 304 if coarse calibration is enabled. Coarse calibration is enabled when a coarse calibration signal (illustrated as "cldrlf_coarse_mode_en") is provided as input. Otherwise, the state machine 202 advances to the Fine Run state 306.

While in state 304, the state machine 202 waits a predetermined number of clock cycles for a coarse settle time. The coarse settle time can be a predetermined value based on a time it takes for the sampler clocks to settle. When this time expires, the state machine 202 advances to a Coarse Bump Up state 308 if the least significant bit in the X data is 0. Otherwise, the state machine 202 advances to a Coarse Bump Down state 310.

In state 308, the state machine 202 bumps the PI position up by a number of positions specified by a predetermined coarse bump size thereby moving the edge sampler clock later in time relative to the sampled data. The coarse bump size is a factor in the size of the PI step and the duration of the calibration process. A single position bump is performed each clock cycle by supplying a PI bump-up signal to the PI position control component 212. After the specified number of bumps have taken place, the state machine 202 advances to a Coarse Settle Up state 312.

In state 312, the state machine 202 waits a predetermined number of clock cycles for the coarse settle time. When this time expires, the state machine 202 advances to the Coarse Bump Up state 308 if the least significant bit in the X data is 0. Otherwise, the state machine 202 advances to the Fine Run state 306 because the rising edge of the calibration data pattern has been detected.

In state 310, the state machine 202 bumps the PI position down a number of positions specified by the coarse bump size thereby moving the edge sampler clock earlier in time relative to the sampled data. A single position bump down is performed each clock cycle by supplying a PI bump down signal to the PI position control component 212. After the specified number of bumps have taken place, the state machine 202 advances to the Coarse Settle Down state 314.

In state 314, the state machine 202 waits the specified number of clock cycles for the coarse settle time. When this time expires, the state machine 202 advances to the Coarse Bump Down state 310 if the least significant bit in the X data is 1. Otherwise, it advances to the Fine Run state 306 because the rising edge of the calibration data pattern has been detected.

In the Fine Run state 306, the state machine 202 enables the CDRLF 208 to run for predetermined number of clock cycles for fine calibration, in order to make fine adjustments to the PI position. When this time expires, the state machine 202 advances to the Calibration Done state 316.

In the Calibration Done state 316, the calibration is complete. The state machine 202 remains in this state until the calibration run request is disabled (illustrated as "cal_done"), at which time the state machine 202 returns to the Idle state 302.

Referring back to FIG. 2, the coarse calibration lead/lag detection component 204 analyzes the X data to determine whether it is leading or lagging relative to the edge sampler clock and provides a signal to the control state machine 202 to indicate whether the X data is leading or lagging relative to the edge sampler clock.

The fine calibration lead/lag calculation component 206 calculates lead or lag values based on the X data and provides lead and lag values to the CDRLF 208. The CDRLF 208 executes a fine calibration to make fine adjustments to the edge sampler clock based on the lead or lag values provided by the fine calibration lead/lag calculation component 206. In making fine adjustments to the sampler clock, the CDRLF 208 generates and outputs PI bump-up and PI bump-down signals to cause the PI 104 to move the edge sampler clock later or earlier in time, respectively, relative to the sampled data. Further details regarding the fine calibration of the edge sampler clock are discussed below in reference to FIGS. 4, 6A, and 6B.

The multiplexer 210 selects between PI bump-up and PI bump-down signals received from the control state machine 202 and the CDRLF 208 based on whether coarse calibration is enabled. More specifically, the multiplexer 210 selects the PI bump-up and PI bump-down signals from the control state machine 202 when coarse calibration is enabled, and thus the CDRLF 208 is effectively disabled during coarse calibration.

The PI position control component 212 adjusts the PI 104 based on PI bump-up and PI bump-down signals. More specifically, the PI position control component 212 causes the PI 104 to phase shift the sampler clocks driven by the PI 104 based on the PI bump-up and PI bump-down signals. One or more analog phase delay components can be included in the PI 104 to phase shift the edge sampler clock.

Consistent with some embodiments, the PI bump-up and PI bump-down signals cause the PI 104 to phase shift all sampler clocks generated by the PI 104. Thus, consistent with these embodiments, it shall be appreciated that in instances in which the edge sampler clock is moved earlier or later in time, other sampler clocks generated by the PI 104 are similarly moved earlier or later in time by the same amount as the edge sampler clock.

Figure 4:
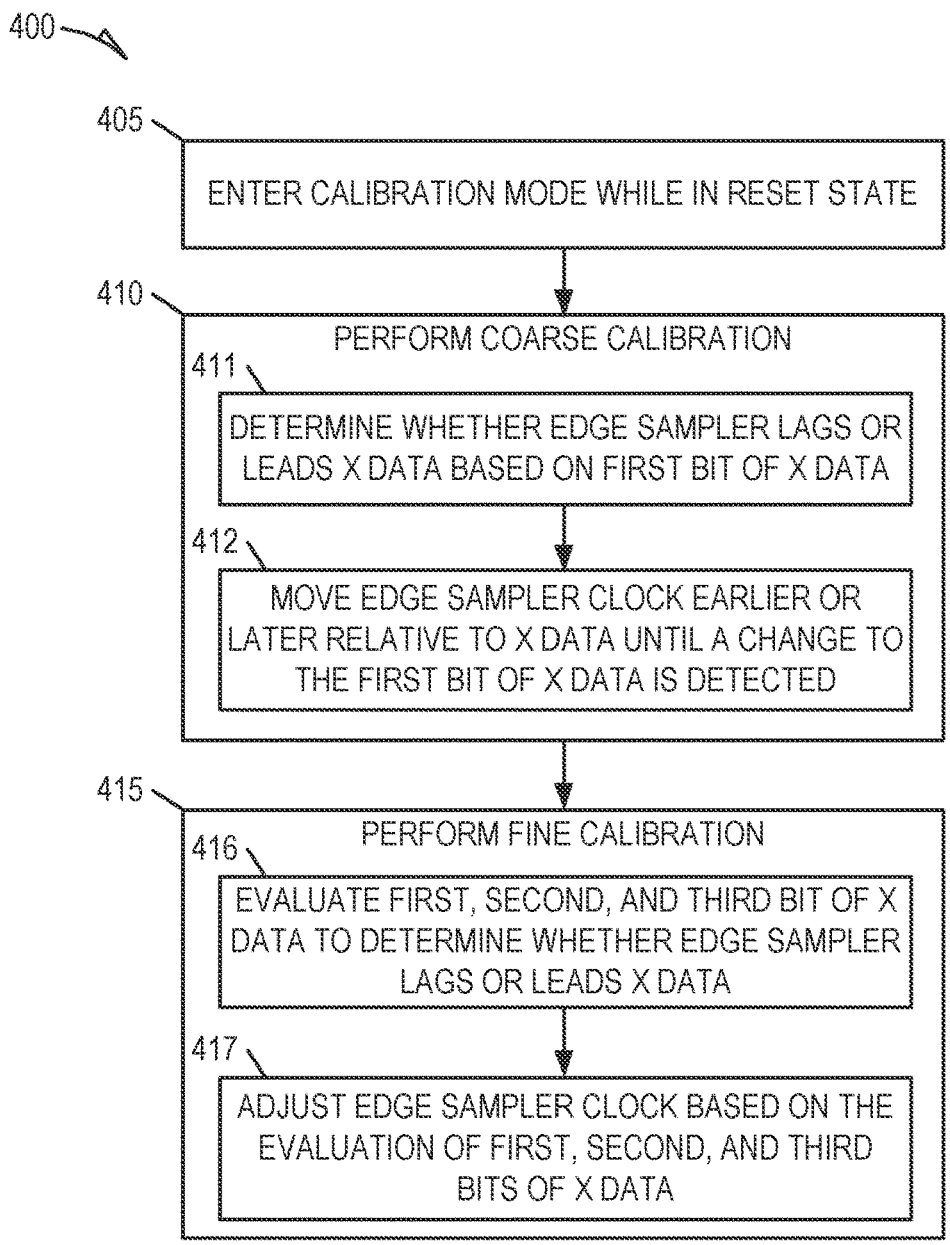
FIG. 4 is a flow chart illustrating operations of the data alignment system for performing a method of data alignment within the PHY device, according to some example embodiments.

FIG. 4 is a flow chart illustrating operations of the data alignment system for performing a method 400 of data alignment within the PHY device 100, according to some example embodiments. The method 400 can be initiated at system start-up, or in embodiments in which the device 100 is part of a RX PHY, at any time during normal operation in which data transfer is not occurring within the RX PHY.

At operation 405, the PHY device 100 enters a calibration mode. The PHY device 100 may enter the calibration mode in response to a request to run a calibration. While in the calibration mode, a TX PHY transmits a predefined serial calibration data pattern (e.g., 32'h001FFFFE) to the PHY device 100. The calibration data pattern is defined such that a rising edge exists between a first and second bit (bit 0 and bit 1) to align data in the data path of the PHY device 100.

A sampler 106 in each of the analog communication lanes 102-1 to 102-N produces sampled data by sampling the calibration data pattern at intervals based on sampler clocks generated by a corresponding PI 104 in the analog communication lane. A deserializer 108 in each of the analog communication lanes 102-1 to 102-N deserializes the sampled data and provides the deserialized sampled data as output. Data sampled using the edge sampler clock as well as the non-edge sampler clocks is provided as input to the data alignment system 112.

Within each analog communication lane of the PHY device 100, a data alignment system 112 performs, at operation 410, a coarse calibration on sampler clocks generated by a PI 104 to align the sampled data with the predefined calibration data pattern. In particular, in performing the coarse calibration, the data alignment system 112 aligns a first bit of the X data with a first bit of the predefined calibration data pattern. To align the first bit of the X data with the first bit of the predefined calibration data pattern, the data alignment system 112 moves the sampler clocks later or earlier in time relative to the X data. The data alignment system 112 moves the sampler clocks later or earlier in time by phase shifting the sampler clocks. The data alignment system 112 phase shifts the sampler clocks by bumping up or bumping down the PI 104 using appropriate signals.

Figure 5A:
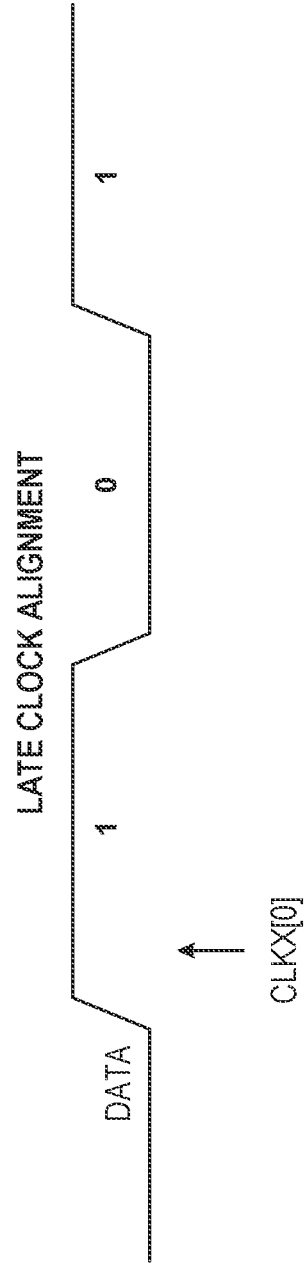
FIGS. 5A and 5B are timing diagrams illustrating a coarse calibration operation performed as part of the method for data alignment, according to some example embodiments.

To determine whether to move the sampler clocks later or earlier in time, the data alignment system 112 evaluates the first bit of the X data to determine whether the edge sampler lags or leads the X data (operation 411). The data alignment system 112 continues to move the sampler clocks until a change in value of the first bit of the X data is detected (operation 412). If the first bit of the X data is 1, the edge sampler clock is late (phase lag) and the data alignment system 112 moves the sampler clocks earlier in time (e.g., by sending a bump-down signal to the PI 104) until a 0 is detected in the first bit of the X data. As an example, FIG. 5A illustrates an example in which the edge sampler clock is "late" relative to the calibration data pattern. As shown in FIG. 5A, based on the edge sampler clock being late relative to the calibration data pattern, the first bit of the X data (clkX[0]) is 1. As noted above, in these instances, the data alignment system 112 bumps down the PI 104 to move the sampler clocks earlier in time until a 0 is detected in the first bit of the X data.

Figure 5B:
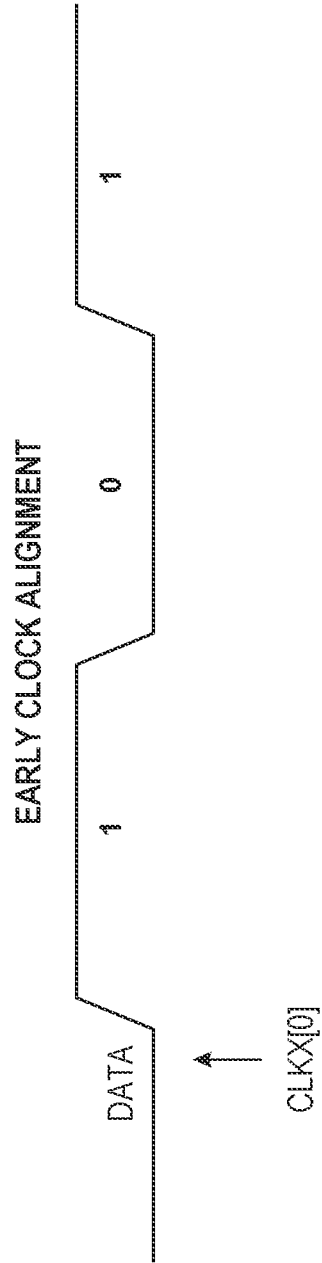

If the first bit of the X data is 0, the edge sampler clock is early and the data alignment system 112 moves the sampler clocks later in time (e.g., by sending a bump-up signal to the PI 104) until a 1 is detected in the first bit of the X data. As an example, FIG. 5B illustrates an example in which the edge sampler clock is "early" relative to the calibration data pattern. As shown in FIG. 5B, based on the edge sampler clock being early relative to the calibration data pattern, the first bit of the X data (clkX[0]) is 0. As noted above, in these instances, the data alignment system 112 bumps up the PI 104 to move the sampler clocks later in time until a 1 is detected in the first bit of the X data.

Referring back to FIG. 4, within each analog communication lane of the PHY device 100, the data alignment system 112 performs, at operation 415, a fine calibration on the edge sampler clock to further align the sampled data with the predefined calibration data pattern. Similar to the coarse calibration performed at operation 410, in performing the fine calibration, the data alignment system 112 moves the edge sampler clock later or earlier in time relative to the X data by phase shifting the edge sampler clock by bumping up or bumping down the PI 104 using appropriate signals. In contrast with the coarse calibration, the fine calibration includes adjustments to the edge sampler clock based on an evaluation of the first, second, and third bits of the X data. More specifically, the data alignment system 112 evaluates whether the edge sampler clock lags or leads the X data based on first, second, and third bits of the X data (operation 416) and adjusts the edge sampler clock based on the evaluation of the first, second and third bits of the X data (operation 417).

Figure 6A:
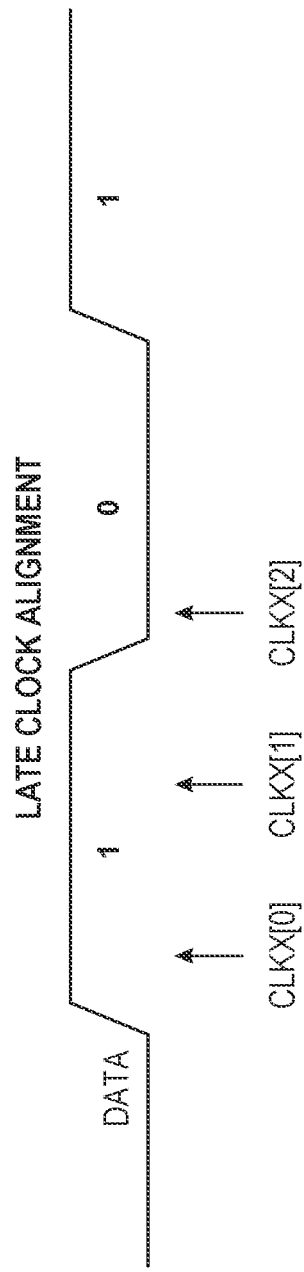
FIGS. 6A and 6B are timing diagrams illustrating a fine calibration operation performed as part of the method for data alignment, according to some example embodiments.

If data alignment system 112 determines the edge sampler clock lags the X data based on the first, second, and third bits, the data alignment system 112 provides a bump-up signal to the PI 104 to move the edge sampler clock earlier in time relative to the X data. As an example, FIG. 6A illustrates an example in which the edge sampler clock is "late" relative to the calibration data pattern. As shown in FIG. 6A, the first bit of the X data clkX[0] is 1, the second bit of the X data clkX[1] is 1, and the third bit of the X data clkX[0] is 0 thereby indicating phase lag in the edge sampler clock. In these instances, the data alignment system 112 bumps down the PI 104 to move the edge sampler clock earlier in time.

Figure 6B:
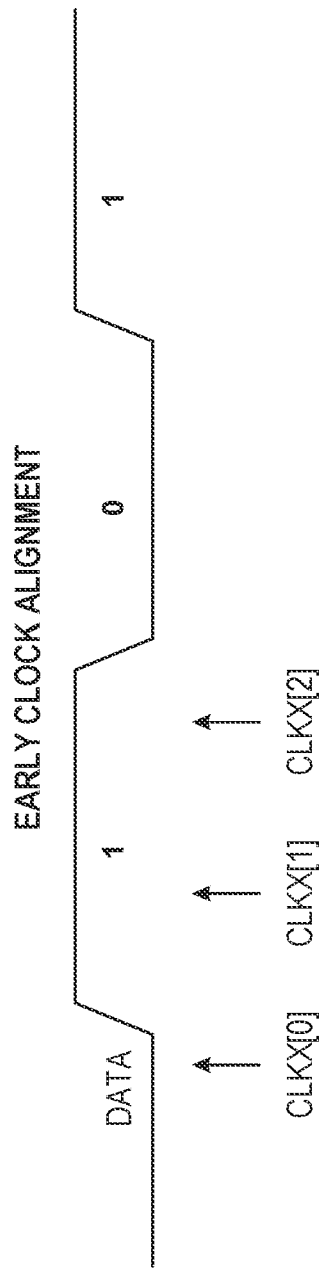

If data alignment system 112 determines the edge sampler clock leads the X data based on the first, second, and third bits, the data alignment system 112 provides a bump-down signal to the PI 104 to move the edge sampler clock later in time relative to the X data. As an example, FIG. 6B illustrates an example in which the edge sampler clock is "early" relative to the calibration data pattern. As shown in FIG. 6B, the first bit of the X data clkX[0] is 0, the second bit of the X data clkX[1] is 1, and the third bit of the X data clkX[0] is 1 thereby indicating phase lead in the edge sampler clock. In these instances, the data alignment system 112 bumps up the PI 104 to move the edge sampler clock later in time.

As a further example of the foregoing, Table 1, presented below, lists the determinations made by the data alignment system 112 based on examples of first, second, and third bit values in the X data (clkX[0], clkX[1], and clkX[2]).

TABLE 1

| CLKX[0] | CLKX[1] | CLKX[2] | Clock Phase |
|---------|---------|---------|-------------|
| 0 | 0 | 0 | Lag |
| 0 | 0 | 1 | Lead |
| 0 | 1 | 0 | No Lead or Lag |
| 0 | 1 | 1 | Lead |
| 1 | 0 | 0 | Lag |
| 1 | 0 | 1 | Lag |
| 1 | 1 | 0 | Lag |
| 1 | 1 | 1 | No Lead or Lag |

As shown, in some instances, namely when clkX[0], clkX[1], and clkX[2] are '010' and '111', the data alignment system 112 determines that there is no lag or lead in the edge sampler clock. In these instances, the data alignment system 112 performs no adjustments to the edge sampler clock. That is, the data alignment system 112 provides no bump-up or bump-down signal to the PI 104.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A device comprising:
   a phase interpolator to provide a set of sampler clock signals;
   a sampler to sample a calibration data pattern based on the set of sampler clock signals and provide sampled data at a sampler output; and
   a data alignment system to perform operations comprising:
      performing a coarse calibration on the set of sampler clock signals by moving the set of sampler clock signals earlier or later in time relative to the sampled data based on a first bit of the sampled data; and
      performing a fine calibration on the set of sampler clocks signals by moving the set of sampler clock signals earlier or later in time relative to the sampled data based on the first bit, a second bit, and a third bit in the sampled data.

2. The device of claim 1, further comprising:
   a set of communication lanes, the phase interpolator and the sampler being included in a first communication lane in the set of communication lanes.

3. The device of claim 1, wherein the coarse calibration includes moving the set of sampler clock signals earlier or later in time relative to the sampled data until a change in a value of the first bit is detected.

4. The device of claim 1, wherein the coarse calibration further comprises:
  determining whether a first sampler clock signal in the set of samplers clock signals lags or leads the sampled data based on a value of the first bit.

5. The device of claim 4, wherein:
  the data alignment system determines the first sampler clock signal lags the sampled data based on the first bit of the sampled data; and
  the data alignment system moves the set of sampler clock signals earlier in time based on determining the first sampler clock signal lags the sampled data.

6. The device of claim 4, wherein:
  the data alignment system determines the first sampler clock signal leads the sampled data based on the first bit of the sampled data; and
  the data alignment system moves the set of sampler clock signals later in time based on determining the first sampler clock signal leads the sampled data.

7. The device of claim 1, wherein the coarse calibration further comprises:
  determining whether a first sampler clock signal in the set of sampler clock signals lags or leads the sampled data based on values of the first, second, and third bits in the sampled data.

8. The device of claim 1, wherein the coarse calibration and the fine calibration align the first bit of the sampled data with a first bit of the calibration data pattern.

9. The device of claim 1, wherein the data alignment system moves the set of sampler clock signals earlier or later in time by causing the phase interpolator to phase shift the set of sampler clock signals.

10. The device of claim 9, wherein the phase interpolator includes one or more delay elements to phase shift the set of sampler clock signals.

11. A method comprising:
  generating, by a phase interpolator, a set of sampler clock signals;
  sampling, by a sampler connected to the phase interpolator, a calibration data pattern based on the set of sampler clock signals, the sampling of the calibration data pattern resulting in sampled data;
  performing, by a data alignment system, a coarse calibration on the set of sampler clock signals, the coarse calibration including moving the set of sampler clock signals earlier or later in time relative to the sampled data based on a first bit of a sampled data; and
  performing, by the data alignment system, a fine calibration on the set of sampler clock signals, the fine calibration including moving the set of sampler clock signal signals earlier or later in time relative to the sampled data based on the first bit, a second bit, and a third bit in the sampled data.

12. The method of claim 11, wherein:
  the phase interpolator and the sampler are included in a first communication lane among a set of communication lanes.

13. The method of claim 11, wherein the coarse calibration includes moving the set of sampler clock signals earlier or later in time relative to the sampled data until a change in a value of the first bit is detected.

14. The method of claim 11, wherein the coarse calibration further comprises:
  determining whether a first sampler clock signal in the set of sampler clock signals lags or leads the sampled data based on a value of the first bit.

15. The method of claim 14, wherein moving the set of sampler clock signals includes one of:
  moving the set of sampler clock signals earlier in time based on determining the first sampler clock signal lags the sampled data; and
  moving the set of sampler clock signals later in time based on determining the first sampler clock signal leads the sampled data.

16. The method of claim 14, wherein the coarse calibration further comprises:
  determining whether the first sampler clock signal lags or leads the sampled data based on values of the first, second, and third bits in the sampled data.

17. The method of claim 11, wherein the coarse calibration and the fine calibration align the first bit of the sampled data with a first bit of the calibration data pattern.

18. The method of claim 11, wherein the data alignment system moves the set of sampler clock signals earlier or later in time by causing the phase interpolator to phase shift the set of sampler clock signals.

19. The method of claim 18, wherein the phase interpolator includes one or more delay elements to phase shift the set of sampler clock signals.

20. A system comprising:
  a state machine to evaluate a first bit of sampled data to determine whether a set of sampler clock signals used to sample a calibration pattern lags or leads the sampled data, the sampled data corresponding to the calibration pattern, the state machine further to generate a first signal based on evaluating the first bit of the sampled data, the first signal indicating whether the sampled data lags or leads the sampled data based on the first bit of the sampled data;
  a clock data recovery loop filter (CDRLF) to evaluate the first bit and second and third bits of the sampled data to determine whether the set of sampler clock signals lag or lead the sampled data, the CDRLF further to generate a second signal based on evaluating the first, second, and third bits of the sampled data, the second signal indicating whether the set of sampler clock signals lags or leads the sampled data based on the first, second, and third bits of the sampled data; and
  a phase interpolator position control component to adjust the set of sampler clock signals based on the first and second signals, the phase interpolator position control component to adjust the set of sampler clock signals by causing a phase interpolator to phase shift the sampler clock signal based on the first and second signals.

* * * * *